May 12, 1942.   G. AUSTRIA   2,282,598
TIRE
Filed Sept. 13, 1939

Inventor
Guillermo Austria
By R. S. Berry
Attorney

Patented May 12, 1942

2,282,598

UNITED STATES PATENT OFFICE 2,282,598

TIRE

Guillermo Austria, Los Angeles, Calif.

Application September 13, 1939, Serial No. 294,703

2 Claims. (Cl. 152—340)

This invention relates to a pneumatic tire and more particularly pertains to that type of pneumatic tire embodying a pair of internal air chambers arranged side by side and extending circumferentially of the tire with the chambers separated by an expansible partition which is adapted to serve as a puncture seal on deflation of either of the air chambers while the other of the chambers is inflated under sufficient pressure to cause the partition to conform to the contours of that inner portion of the tire occurring on exhausting air from one of the chambers.

While various constructions have heretofore been proposed for tires of this character very little has been accomplished in the production of a practical and economical tire of this sort. One of the difficulties encountered in constructing a tire of this type is to provide an arrangement whereby the separate air chambers may be readily inflated through the usual pneumatic valve arrangement, while another difficulty has been to provide a double inner tube construction which will permit one of the tubes to expand in overlying relation to the other without the formation of sharp bends in the inner tubes that are liable to cause pinching with possible breaking or rupturing of bent portions of the tube.

An object of the invention is to provide a construction in a double inner tube pneumatic tire whereby the difficulties above recited are overcome and in which an ordinary pneumatic tire carcass may be readily equipped with a pair of inner tubes that are so formed and arranged as to produce the desired double air chamber construction.

With the foregoing objects in view, together with such other objects and advantages as may subsequently appear, the invention is carried into effect as illustrated by way of example in the accompanying drawing, in which.

Figure 1:
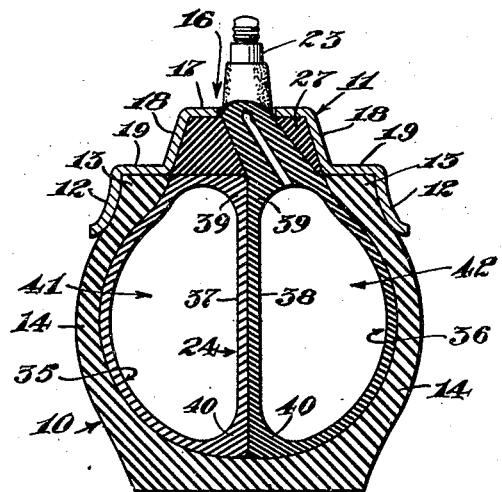
Fig. 1 is a view in cross section illustrating the invention as applied and showing the tire chambers as correspondingly inflated.

Referring to the drawing more specifically 10 indicates generally a conventional pneumatic tire carcass and 11 designates a conventional wheel rim having side flanges 12 adapted to receive and engage the inner marginal portions 13 of the side walls 14 of the carcass 10.

The carcass 10 embodies the usual tread portion 15 uniting the side walls 14 and the wheel rim 11 embodies the usual intermediate circumferentially extending channel portion 16 embodying an inner wall 17 and outwardly diverging side walls 18 which latter connect with laterally extending walls 19 leading to the side flanges 12.

In carrying out the invention a pair of separate and independent continuous inner tubes 35 and 36 are provided and which are adapted to be disposed interiorly of the carcass 10 and to be inflated therein through the medium of a conventional tire valve 23 with which each of the tubes 35 and 36 is equipped. The inner tubes 35 and 36 are formed of elastic material such as rubber or rubber composition as is common in inner tube construction, and are designed to be positioned side by side interiorly of the carcass 10 so that when inflated they will abut each other with the contiguous walls of the tubes forming a partition 24 separating the pair of air chambers 41 and 42 afforded by the tubes 35 and 36.

Mounted in the channel portion 16 of the wheel rim 11 is a resilient band 27 against which the inner peripheral portions of the inner tubes 35 and 36 abut and through which band is passed the inner portion 28 of the valve stem 23 which stem has an outer end portion protruding through the inner wall portion 17 of the wheel rim as particularly shown in Fig. 1.

The pair of inner tubes 35 and 36 are so formed that their abutting wall portions 37 and 38 will extend with their contiguous faces leading from the outer periphery of the band 17 to the inner periphery of the tread portion 15 of the carcass 10, and the marginal inner and outer portions of the walls 37 and 38 are formed on their inner sides with thickened portions 39 and 40 respectively that merge into the inner and outer peripheral portions of the tube; the thickened wall portions 39 and 40 forming the requisite wall thickness at the inner and outer margins of the walls 37 and 38 separating the air chambers 41 and 42 afforded by the pair of tubes 35 and 36 for preventing the formation of sharp bends in the inner tubes that are liable to cause pinching with possible breaking or rupturing of bent portions of the tube on collapse of the tube in event of deflation thereof. In order to accomplish this result the thickened portions 39 and 40 are formed with arcuate inner faces merging at their outer ends into the curved inner faces of the outside walls of the tubes and merging at their inner ends into straight inner faces of the partition wall portions 37 and 38. Each of the arcuate inner faces of the thickened portions 39 and 40 is formed on a curve the radius of which has a length exceeding the thickness of the side and partition walls of the tube.

In the application and operation of the invention the inner band 17 is initially put in place in the intermediate channel 18 of the wheel rim whereupon the carcass 10 with the pair of inner tubes therein is applied to the wheel rim in the usual fashion with the valve stem 23 extended through the wheel rim and band preferably with the valve stem of one tube disposed in close proximity to that of the other. The inner tubes are then inflated to have substantially corresponding extents of inflation by building up substantially corresponding air pressures therein. When equally and properly inflated the parts will assume the position shown in Fig. 1, that is, with the inner peripheral portions of the inner tubes abutting the liner band 27 and with the contiguous walls of the inner tube extending substantially on a plane from the band 27 to the tread portion of the tire carcass.

Figure 2:
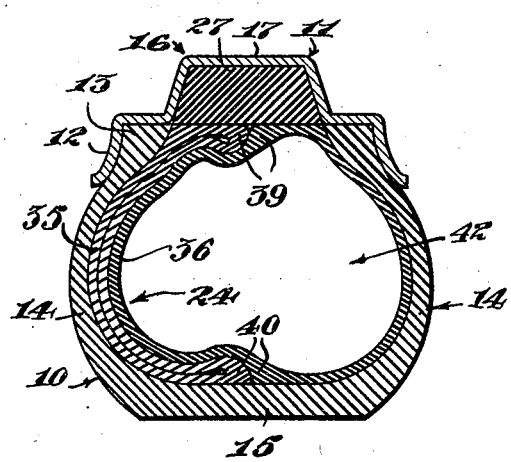
Fig. 2 is a view in section of the structure shown in Fig. 1 with one of the chambers deflated and the partition of the other expanded.

In event of deflation of one of the inner tubes as might be occasioned by a puncture or a blowout, the other tube will be distended by the expansion of air under pressure therein so as to cause the inner side wall portion thereof overlying the inner side wall portion of the contiguous tube to crowd the latter to a collapsed position, as indicated for example in Fig. 2, in the fashion well known in tires of this type. However, by the provision of the thickened wall portions at the inner and outer margins of the separated walls of the inner tubes the collapsed tube will be disposed with the side wall portions thereof overlying each other with the return bends at the inner and outer marginal portions of the collapsed tube rounded and reinforced by the thickness afforded by the fillets 39—40 and whereby the wall of the inflated inner tube is caused to overlie the bends in the collapsed inner tube in a manner to obviate pinching and possible rupture of either of the tubes as otherwise might occur, and whereby the partly deflated tire may be utilized with little or no danger of its being pinched by reason of the presence of the deflated inner tube contiguous thereto.

I claim:

1. In a pneumatic tire, a tire carcass, a pair of inflatable inner tubes arranged side by side in said carcass adapted when correspondingly inflated to form a double wall partition therebetween, each of said tubes being formed with an increased wall thickness at the inner and outer peripheral portion of the partition walls thereof, said increased wall thickness having an arcuate inner face formed on a curve the radius of which has a length exceeding the thickness of the partition wall of the tube.

2. In a pneumatic tire, a tire carcass, a pair of inflatable inner tubes arranged side by side in said carcass adapted when correspondingly inflated to form a double wall partition therebetween, a reinforcing wall at the juncture of the inner peripheral portions of said tubes and a reinforcing wall at the juncture of the outer peripheral portions of said tubes; said reinforcing walls being formed integral with and forming portions of said tubes, each of said reinforcing walls having an arcuate inner face formed on a curve the radius of which has a length exceeding the thickness of the partition wall.

GUILLERMO AUSTRIA.